Oct. 19, 1926.
W. F. HUNDEMER
1,603,916
HIGH PRESSURE GREASE CONDUIT
Filed July 21, 1924
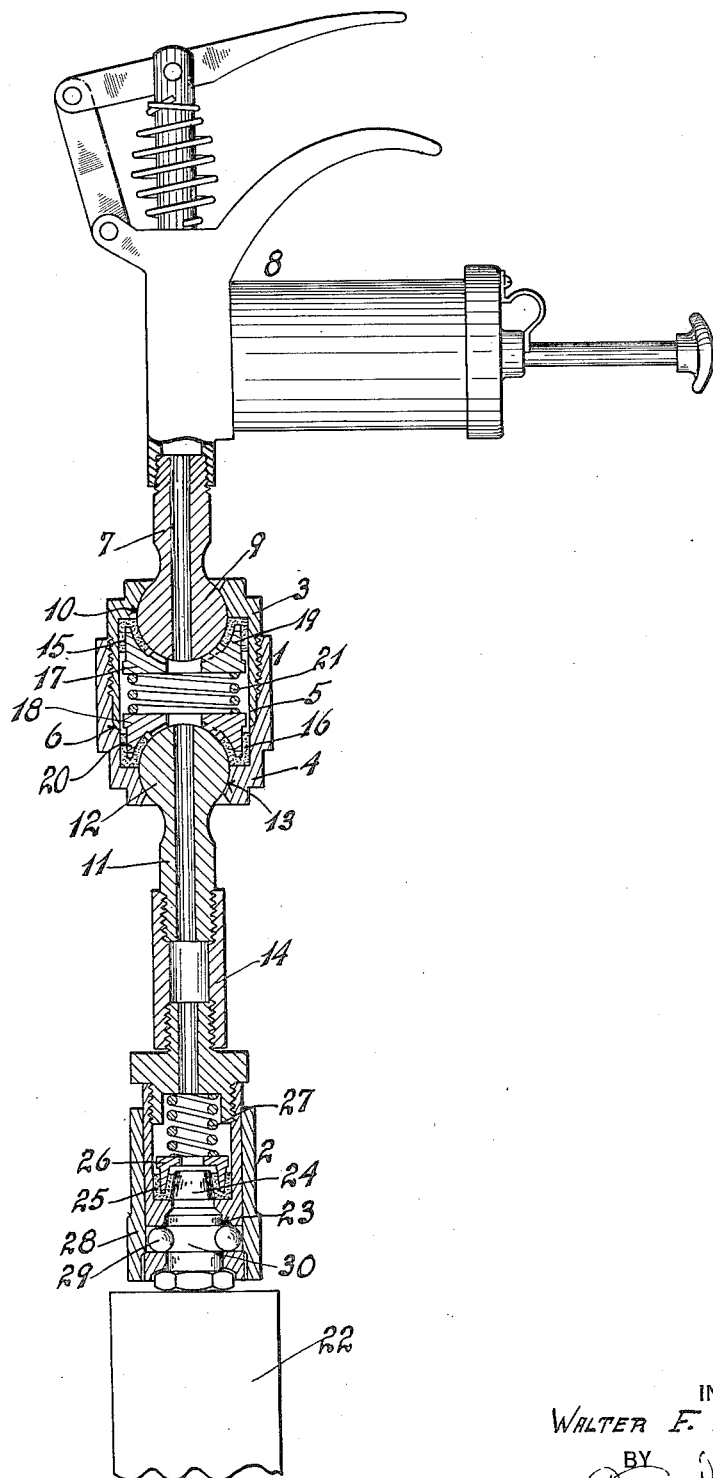
INVENTOR
WALTER F. HUNDEMER.
BY
ATTORNEY Patented Oct. 19, 1926.

1,603,916

UNITED STATES PATENT OFFICE.

WALTER F. HUNDEMER, OF ALAMEDA, CALIFORNIA, ASSIGNOR TO HARSHAW CORPORATION, OF OAKLAND, CALIFORNIA, A CORPORATION OF CALIFORNIA.

HIGH-PRESSURE GREASE CONDUIT.

Application filed July 21, 1924. Serial No. 727,342.

My invention is an improved high pressure grease conduit and coupling particularly applicable for the lubrication of machine bearings.

The object of my invention is to provide a packing means for the various movable parts and couplings which will not leak under the high pressure. An object of my invention is to make a flexible joint or coupling using a cupped flexible washer with a forming member adapted to force the washer into shape independent of its shaping under the pressure due to the oil being conveyed through the joint or coupling. I have a ball joint with cups forming bearings for the balls ducts passing through the joint, and the flexible cupped washers bearing on the inner periphery of the ball joints. They are held in place by forming washers having ring extensions to positively shape the washers. A coupling having a tapered fitting may also be used with the cupped washers and the forming washers fitting therein. It is desirable to have some means for positively pressing the forming washers into the cupped part of the flexible washer and this may be done by a spring. However, in a ball joint I limit the movement of the forming washers by having them bear on the surface of the spherical ball.

In high pressure flexible joints it is difficult to prevent the leakage of oil through the screw threads. I, therefore, provide a form of contacting parts on the screw threaded members, whereby the inner member, preferably of a cup, is pressed inwardly against the other forming an oil tight joint independent of the threads. The joint shown herein is to a certain extent an improvement over my application, Serial Number 682,933, for flexible joint, filed December 27, 1923, and is designed particularly to utilized the U shaped washers shown in application of Claude E. White, Serial Number 724,299, filed July 5, 1924.

In the annexed drawing in which my invention is illustrated, the figure in the drawing is a longitudinal sectional view of my conduit in position in a grease gun and a bearing.

Referring more particularly to the drawing, my conduit consists of a flexible joint 1 and a coupling 2 on the end thereof. The joint 1 is formed of two cups 3 and 4, the cup 3 threading into the cup 4. The cup 3 has an extension 5 beyond the threads thereon which tapers to a thin edge, and is adapted to seat against a taper seat 6 in the cup 4. Thus when the two cups are secured together the extension 5 will conform to the seat 6 and press tightly thereon, and thus seal the joint against leakage without relying on the threads.

A conduit 7 is threaded at one end into the pressure gun 8, which is of any desired high pressure type. The other end of the conduit 7 is formed with a ball 9, which is adapted to rest in a seat 10 in the end of the cup 3. A conduit 11 is formed with a ball end 12 which rests in a seat 13 in the cup 4. This conduit also threads into one end of a pipe extension 14, and if desired the coupling 2 is threaded into the other end thereof. The metallic seats 10 and 13 are not sufficient to seal the joint 1 against leakage under high pressures, therefore, cup or U washers 15 and 16 are provided which surround the balls 9 and 12 respectively. These washers must be spread apart so that they will at all times bear against the balls and the sides of the joint, or the grease would creep back of them and thus obviate their usefulness.

To accomplish this purpose, I provide forming washers 17 and 18 which are provided with ring extensions 19 and 20 adapted to extend into the U washers 15 and 16 respectively. A spring 21 bears against the forming washers 17 and 18 to urge them against the U washers 15 and 16 respectively, thus insuring a bearing against the balls 9 and 12 and against the inner wall of the joint 1.

The bearing 22 has a fitting 23 extending therein, the end of which is tapered as at 24 to receive the cup or U washer 25 positioned within the coupling 2. A spreader, or forming washer 26 similar to the washers 17 and 18 enters the cup washer 25 and is held in position by a spring 27.

The coupling 2 is secured to the fitting 23 in any suitable manner, such as by a sleeve 28 forcing the balls 29 into an annular groove 30 in the fitting.

The forming washers 17 and 18 do not press tightly against the U washers 15 and 16, but bear against the balls 9 and 12. Thus, the U washers float between the forming washers and the housing, except when under pressure, at which time they press tightly against the balls and the housing. Thus there is very little wear upon the U washers which materially increases their life.

It will be noted that the balls 9 and 12 in so far as their action with the cupped washers 15 and 16 is concerned, function substantially the same as the tapered fitting 23 in the coupling. This latter has a conical taper, whereas the ball joints have a spherical taper. Both utilize the forming washers 17, 18 and 26 in the coupling member. The forming washers 26 may be pressed tightly into the cupped washers 25 by the spring 27, but in the ball joint it is desired to limit the pressing action of the forming washers 17 and 18 by merely having the ring extensions 19 and 20 extend into the cupped washers but not force it against the cups 3 and 4. To effect this, forming washers 17 and 18 bear upon the inner spherical surface of the balls 9 and 12.

It will be noted that the extension 5 of the cup 3 is brought to a thin edge and presses against the seat 6, which is curved, of the cup 4. When two cups are taken together by a screw threaded connection the extension 5 is forced inwardly and makes an oil tight circular joint at either point of contact, so that the screw threads are not relied upon to form an oil tight connection between the cups.

It will be noted that the cupped washers are annular and have lips of considerable extent so that as the cupped washer is made of flexible material these lips will conform to the shape of the tapered fitting and the outside walls and when used in the ball joint conform to the shape of the ball and also bear tightly against the outside walls. It is also to be noted that the forming washers are of a floating type and extend inwardly between the lips of the cupped washer holding these in their required shape, both before they are subjected to the pressure of the grease being transmitted and after such pressure is removed. These cupped washers and their co-operating forming washers are to be distinguished from packing rings which are held in position by an annular ring pressing thereagainst which latter structures do not preform a cupped washer and do not perform any function due to the pressure of the grease or fluid being transmitted.

Having described my invention, I claim:

1. In a flexible joint of the character described, two cups adapted for engagement at their open ends to form a chamber and having ball seats formed in the bottoms thereof, axially bored links terminating in balls adapted to be seated on said seats so as to project into the chamber with an annular space formed around the projecting portion, a washer in said space having a flange rising from its inner edge formed to lie against the ball and confining means for the flange bearing on the ball and made to direct a pressure medium within the chamber to become effective on the upper edge of the flange only.

2. In a flexible joint of the character described, two cups adapted for engagement at their open ends to form a chamber and having ball seats formed in the bottom thereof, axially bored links terminating in balls adapted to be seated on said seats so as to project into the chamber with an annular space formed around the projecting portions, a washer in said space having a flange rising from its inner edge formed to lie against the ball, and spring separated elements bearing on the balls for spacing the same and having tongues extending therefrom formed to lie against the outer faces of the said flanges, the contact between the spring-pressed elements and the balls preventing the tongues from wedging into the washers.

3. In a flexible joint of the character described, two cups adapted for engagement at their open ends to form a chamber and having ball seats formed in the bottoms thereof, axially bored links terminating in balls adapted to be seated on said seats so as to allow the balls to project into the chamber with an annular space formed around the same, a washer in said space having a flange rising from its inner edge formed to lie against the ball and having a flange rising from its outer edge formed to lie against the wall of the cup and spacing means for the two flanges having means associated therewith preventing the same from being forced into the washer beyond a predetermined depth.

4. In a flexible joint of the character described, two cups adapted for engagement at their open ends to form a chamber and having ball seats formed in the bottoms thereof, axially bored links terminating in balls adapted to be seated on said seats so as to allow the ball to project into the chamber with an annular space formed around the projecting portion, a washer in said space having a flange rising from its inner edge formed to lie against the ball and having a flange rising from its outer edge formed to lie against the wall of the cup and spring-separated elements spacing the balls having tongues extending therefrom into the space between the flanges for spacing and confining the latter and means preventing the tongues from entering the washer beyond a predetermined depth.

5. In a flexible joint of the character described, two cups engageable with one another for forming a chamber, ball joints seated in the bottoms of the cups and projecting into the chamber, spring-separated elements bearing on the balls for separating the same having tongues extending therefrom in spaced and concentric relation to said balls and a washer at the tip of each tongue having two flanges lining the sides thereof, the said elements having positive stops to endwise motion whereby the tips are prevented from wedging into the washers.

6. In a device of the character described, a cup, a ball joint seated in the bottom thereof and projecting into the cup with an annular chamber formed around the same, a washer for the bottom of the chamber having flanges rising from the edges thereof and lying against the wall of the cup and the ball respectively, and a confining element for the two flanges extending into the space between the same having means associated therewith for holding the same against further penetration while admitting a pressure medium to the upper edges of the flanges.

7. A high pressure grease conduit having a joint comprising in combination a cup, a ball having a duct therethrough seated in the cup, a cupped washer seated in the cup and bearing on the ball, a forming washer having extensions positively expanding the cupped washer, and a spring bearing on the forming washer, the latter bearing on the spherical ball to limit its movement.

8. A high pressure grease conduit having a joint comprising in combination a plurality of cups, a screw threaded means for connecting said cups, a ball having a duct therethrough seated in each cup, a cupped washer in said cups bearing on the balls, a forming washer having an extension expanding each cupped washer, and a spring between the forming washers, the latter being made to bear on the balls for limiting their movement.

In testimony whereof I affix my signature.

WALTER F. HUNDEMER.